United States Patent [19]
Schuettenberg

[11] Patent Number: 6,109,642
[45] Date of Patent: Aug. 29, 2000

[54] SELF-LUBRICATED KING PIN AND SADDLE ASSEMBLY

[75] Inventor: Donald W. Schuettenberg, Vancouver, Wash.

[73] Assignee: ATC Leasing Company, Kenosha, Wis.

[21] Appl. No.: 09/164,617

[22] Filed: Oct. 1, 1998

[51] Int. Cl.[7] .................................................... B60P 3/075
[52] U.S. Cl. ..................... 280/433; 280/402; 280/495; 414/563
[58] Field of Search .................................... 280/402, 433, 280/456.1, 461.1, 416.1, 418.1, 495; 414/563

[56] References Cited

U.S. PATENT DOCUMENTS

| | | | |
|---|---|---|---|
| 2,436,485 | 2/1948 | Roxy | 280/402 |
| 2,451,119 | 10/1948 | Regan | 280/402 |
| 3,931,957 | 1/1976 | Thibodeaux | 414/563 |
| 4,047,733 | 9/1977 | Parkes . | |
| 4,149,643 | 4/1979 | Skala et al. . | |
| 4,544,175 | 10/1985 | Hubert . | |
| 4,555,214 | 11/1985 | Morton . | |
| 4,607,422 | 8/1986 | Scaramucci | 29/890.13 |
| 4,708,358 | 11/1987 | Gehman et al. . | |
| 4,867,468 | 9/1989 | Paul et al. . | |
| 4,949,985 | 8/1990 | Lichter | 280/402 |
| 5,246,244 | 9/1993 | Colibert | 280/433 |
| 5,657,833 | 8/1997 | Freeman | 184/18 |
| 5,722,677 | 3/1998 | Lichter et al. . | |
| 5,738,361 | 4/1998 | Dula | 224/533 |

*Primary Examiner*—Lanna Mai
*Assistant Examiner*—Hau Phan
*Attorney, Agent, or Firm*—Reinhart, Boerner, Van Deuren, Norris & Rieselbach, s.c.

[57] ABSTRACT

A self-lubricating saddle which continually lubricates the rotational elements thereof as the saddle is in use. Generally, the saddle comprises a base, a surface plate, and a saddle head. A king pin extending substantially through the center of these three components, provides a pivot point for horizontal rotation. A grease fitting is located on an upper surface of the saddle head, in a position which is easily accessible to maintenance personnel. An inlet extends from the grease fitting through the saddle head to a grease reservoir defined by a conduit or duct on the lower surface plate of the saddle head. Grease or other lubricants are retained to provide continual lubrication of the rotational elements of the saddle, and also to provide lubricants directly to the rotational elements.

20 Claims, 3 Drawing Sheets

SELF-LUBRICATED KING PIN AND SADDLE ASSEMBLY

BACKGROUND OF THE INVENTION

The invention relates generally to an apparatus for coupling wheeled vehicles together to permit one vehicle to tow another, and more particularly to a self-lubricating saddle mount for coupling a leading vehicle to a towed vehicle.

Devices for coupling vehicles together for purposes of either towing a disabled vehicle or for shuttling vehicles between multiple locations are well known. Conventionally, a saddle, designed to couple a lead vehicle to a towed vehicle, is coupled to the lead vehicle. In truck applications, the saddle is conventionally mounted to either the fifth wheel, or to the frame of the lead truck. The saddle is then generally coupled to the front axle of the towed vehicle, such that the front axle of the towed vehicle is lifted from the ground, and the towed truck rolls on the rear wheels only. Alternatively, a second saddle can be mounted on a second vehicle by way of a fifth wheel or a frame application. A beam or boom assembly is then used to couple the two vehicles. In these instances, the second/towed is reversed with the rear elevated and the rear wheels lifted from the ground. Such use of a saddle is more fully described in U.S. Pat. No. 5,722,677 which is incorporated by reference herein in its entirety.

In towing applications, the towed truck must be able to rotate in a horizontal plane in order to properly follow the lead truck through curves and corners. To assure the ability of the towed truck to track behind a turning lead truck, it is important that the rotating elements of the saddle mount be able to rotate with minimal frictional interference. Therefore, the rotating elements of the saddle mount or saddle mounts must be properly lubricated.

In prior art saddle devices, lubricants such as greases or lubricating oils are intended to be applied directly to the rotating elements. These elements, however, cannot be easily seen or accessed, particularly when the saddle is in use. Maintenance personnel, therefore, frequently apply lubricants to a general area in which the rotating elements are located, rather than to the rotating elements themselves. The process of lubricating the rotating elements is therefore difficult, time consuming, and inefficient. In addition, since lubricants cannot be easily directed to the location in which they are required, significantly more lubricants than would otherwise be necessary are often applied. Furthermore, to maintain proper lubrication, lubricants must be applied often, thereby requiring frequent maintenance and costly time delays.

SUMMARY OF THE INVENTION

There are a considerable number of problems and deficiencies associated with saddles and/or saddle assemblies, as previously used in the transportation of wheeled vehicles. There is a demonstrated need for an improved saddle construction and methodology for attaining a desired goal of improved lubrication.

Accordingly, it is an object of the present invention to provide an apparatus and/or methodology overcoming various deficiencies and shortcomings of the prior art, including those outlined above. Likewise, an object of the present invention is to provide such a saddle or assembly in which the elements which require lubrication can be easily accessed. Alternatively, an object of the present invention can be to provide a saddle and/or saddle assembly with self-lubricating rotational elements. In turn, another object can be to provide such a saddle and/or assembly which requires less maintenance.

It will be understood by those skilled in the art that one or more aspects of this invention can meet certain objectives, while one or more other aspects can meet certain other objectives. Each objective may not apply equally, in all instances, to every aspect of this invention. As such, the following objects—in light of the prior art regarding saddles, saddle components and the transportation of wheeled vehicles—can be viewed in the alternative with respect to any one aspect of the present invention.

Other objects, features, benefits and advantages of the present invention will be apparent from the summary and subsequent description of one or more preferred embodiments, and will be readily apparent to those skilled in the art of having knowledge of saddle devices, saddle components and the transportation of wheeled vehicles. Such objects, features, benefits and advantages will be apparent from the above as taken in conjunction with the accompanying examples, figures and all reasonable inferences to be drawn therefrom.

The present invention includes a self-lubricating saddle which continually lubricates the rotational elements of a towing saddle as the saddle while in use. Generally, the saddle comprises a base, a surface plate, and a saddle head. A king pin extending substantially through the center of these three components, providing a pivot point for horizontal rotation. A grease fitting is located on an upper surface of the saddle head, in a position which is easily accessible to maintenance personnel. An inlet extends from the grease fitting through the saddle head to a reservoir which can be defined by a conduit or duct in contact with the lower surface plate of the saddle head. Grease or other lubricants are retained in the reservoir to provide lubricants directly to the rotational elements and continual lubrication of the rotational elements of the saddle.

In part, the present invention is a saddle head having upper and lower surfaces. The saddle head can be used in combination with a saddle for connecting one wheeled vehicle to another, such a saddle having a surface plate. The saddle head defines an aperture and has at least one grease fitting on an upper surface and a grease conduit configured on a lower surface adjacent to the surface plate of saddle. The aperture is between the upper and lower surfaces, and the conduit is connected to the fitting with a grease inlet. The conduit can be arranged about the aperture and/or directed to peripheral portions of the lower surface of the saddle head. In preferred embodiments, a boss extends from the lower surface of the saddle head and is configured to have a mating relationship with the saddle surface plate. In such embodiments, the conduit can be arranged about the boss, and an inlet can be positioned adjacent to the boss. Regardless, the conduit can also be directed to peripheral portions of the lower surface.

In part, the present invention is a saddle assembly for connecting one wheeled vehicle to another. The assembly includes: (1) a saddle body with a threaded king pin bolt positioned in a bore through the body of the saddle; (2) a saddle head coupled to the saddle body with a king pin bolt and defining an aperture for the king pin, with the saddle head having at least one grease fitting on and upper portion thereof; (3) a horizontal surface plate on the saddle body facing the lower portion of the coupled saddle head; (4) a grease duct opening on the lower portion of the saddle head. The grease duct can be arranged around the aperture, and can be configured by the facial arrangement of the surface plate in conjunction with the lower portion of the saddle head.

In one or more preferred embodiments, the aperture is fully defined by a boss. In such embodiments, the duct can be arranged circumferentially about the boss. In such embodiments, the boss can be contiguous with a peripheral wall of the duct. Regardless, the duct can be directed toward the periphery of the lower portion of the saddle head. In preferred embodiments, a fifth wheel pin is in threaded engagement with the king pin. In highly preferred embodiments, the king pin is positioned within the bore and can act as a conduit for grease to a fifth wheel pin.

In part, the present invention is a method of using rotational saddle movement to lubricate a king pin component of a saddle assembly. The method includes: (1) providing a saddle body with a threaded king pin bolt positioned in a bore through the body, a saddle head coupled to the saddle body with a king pin bolt and defining an aperture for the king pin, with the saddle head having at least one grease fitting on an upper portion, a horizontal surface plate on the saddle body facing the lower portion of the coupled saddle head, and a duct opening on the lower portion of the saddle head; (2) introducing grease or a suitable lubricant through the fitting of the head and into the duct; and (3) rotating the coupled saddle head about the king pin. Rotational saddle movement, either manually or through use of a saddle assembly in the transportation of wheeled vehicles, provides the desired lubrication.

In preferred embodiments, the aperture is further defined by a boss, and the duct can be arranged circumferentially about the boss. In highly preferred embodiments, the duct is configured by a facial arrangement of the surface plate and the lower portion of the saddle head. Regardless, a fifth wheel pin can be in threaded engagement with the king pin. In such embodiments, the king pin bolt is positioned within the bore and provides a conduit for grease or a suitable lubricant to the fifth wheel pin. Rotation of the saddle head about the king pin extends lubrication to the fifth wheel pin.

In one preferred embodiment, the saddle is a combination saddle, which can provide both a fifth wheel pin for coupling the saddle to the fifth wheel of a truck, and a series of apertures for mounting the saddle to the truck frame with a plurality of U-bolts. When coupled to the fifth wheel, the king pin rotates in the fifth wheel assembly of the truck. Rotation of the king pin allows for overall rotational motion of the saddle as the truck moves. The saddle head is coupled to the surface plate, and the saddle head and surface plate rotate simultaneously. Lubrication is extended to the king pin via the reservoir as the head, plate and king pin rotate.

BRIEF DESCRIPTION OF THE DRAWINGS

Other advantages and features of the invention, together with the organization and manner of operation thereof, will become apparent from the following detailed description when taken in conjunction with the accompanying drawings wherein like elements have like numerals throughout the drawings.

DETAILED DESCRIPTION OF THE PREFERRED EMBODIMENTS

Figure 1:
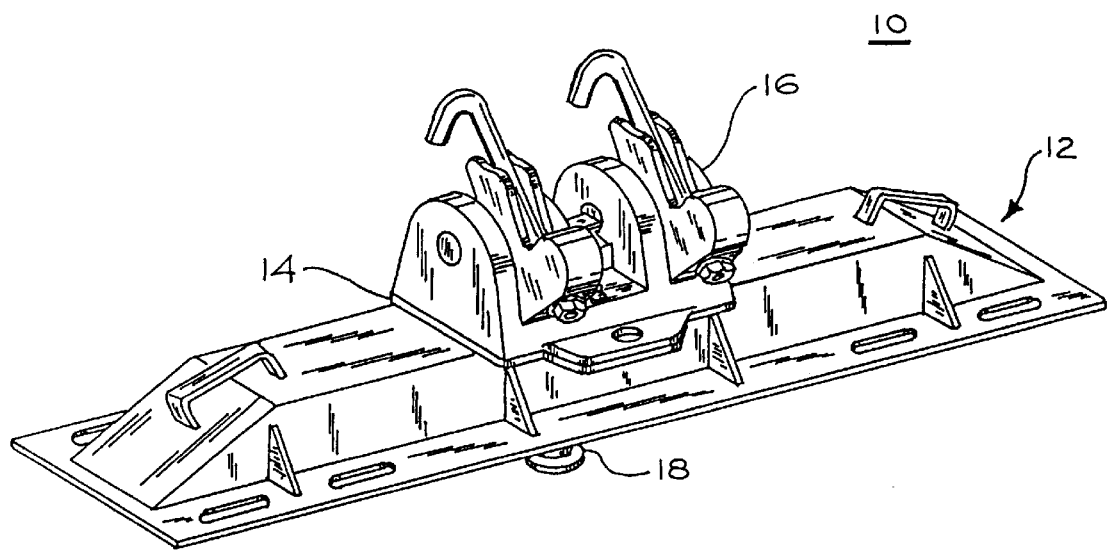
FIG. 1 is an isometric view of a preferred embodiment of a saddle of the present invention.

Referring to the figures, and more particularly to FIG. 1, a saddle in accordance with the present invention is shown at 10. Generally, the saddle 10 comprises a saddle body 12, saddle head surface plate 14, saddle head 16, and king pin bolt 18. The saddle can be used in fifth wheel applications, or can be coupled directly to a truck frame as will be described below. A combination saddle is shown and described in FIG. 1 as a preferred embodiment. Such a saddle can employ the lubricated rotational elements of this invention. However, as would be well known to those skilled in the art and made aware of this invention, other saddles, mounts, assemblies and related towing devices can be used with equal effect and in conjunction with the rotational/lubricating elements of this invention.

Figure 2:
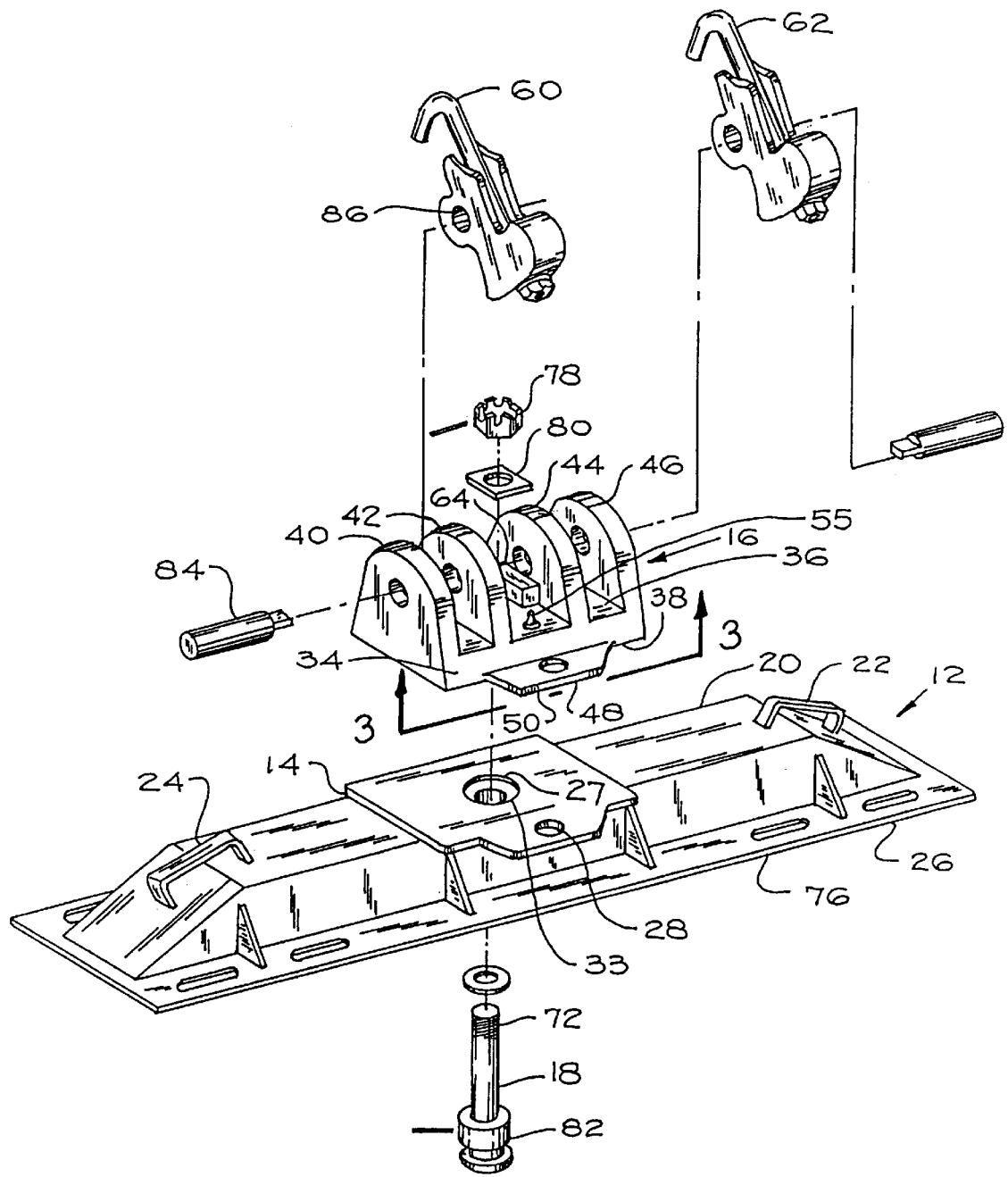
FIG. 2 is an exploded view of the preferred embodiment of the saddle of the present invention.

Referring now to FIG. 2, the saddle body 12 is generally rectangular in shape and is dimensioned to support the saddle head 16 on an elevated platform 20. The handles 22 and 24 are provided to simplify lifting and positioning the combination saddle 10 on a truck frame. A plurality of apertures 26 are located in a flangular section 21 of the body 12. These apertures 26 are dimensioned to receive U bolts for coupling the saddle 10 to channels in a truck frame (not shown). A bore 27, dimensioned to receive a king pin, as will be described more fully below, is substantially centered in the saddle body 12.

The saddle head surface plate 14 is welded or otherwise coupled to the platform 20 of the saddle body 12. The surface plate 14 can be rectangular and can include an extension for accommodating a security bolt hole 28. A generally cylindrical recess 30, substantially centered in the surface plate 14, is dimensioned to receive a saddle head boss 32, which will be described in more detail below. The surface plate 14 also includes a generally centered bore 33 for receiving the king pin 18.

Figure 3:
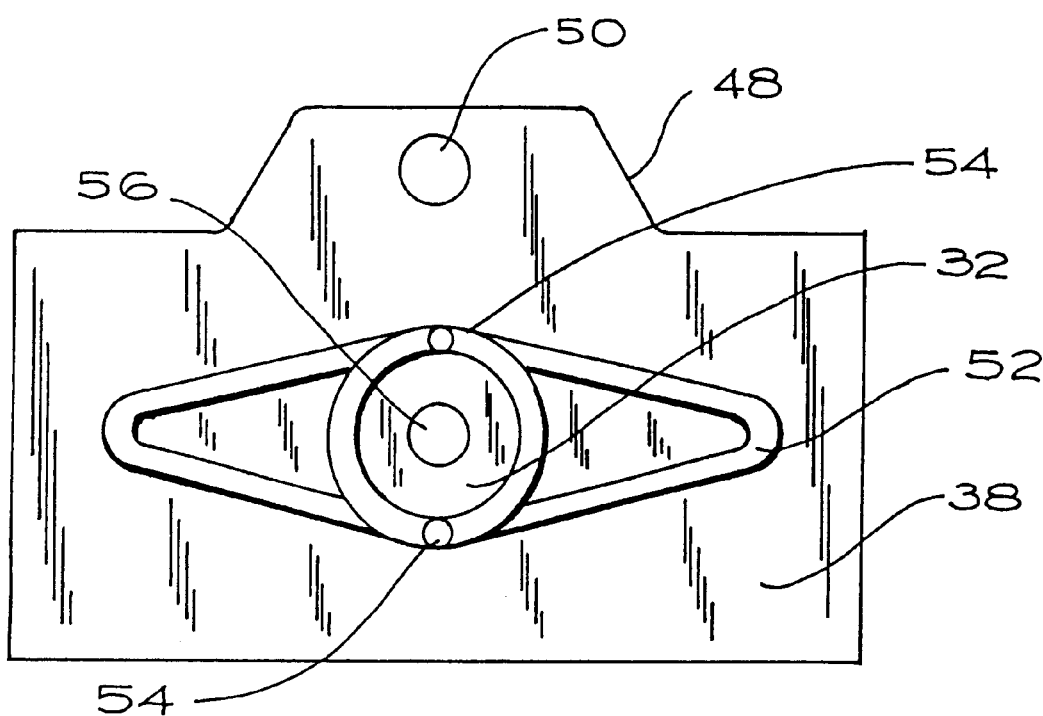
FIG. 3 is a bottom view illustrating the lower lubricating surface of the saddle head shown in FIG. 2 taken along line 3—3 thereof.

Referring to FIGS. 2 and 3, the saddle head 16 generally comprises a base 34 including an upper surface 36, a lower lubricating surface 38, and four ears 40, 42, 44 and 46. The ears 40, 42, 44, and 46 are substantially parallel to each other and extend in a direction substantially perpendicular to the upper surface 36. The base 34 further comprises an extension 48 including a security bolt aperture 50. A substantially centered bore 56, dimensioned to receive the king pin 18, extends from the upper surface 34 and the lower surface 36. The bore 56 is encircled by a generally cylindrical saddle head boss 32 which is dimensioned to be received in the recess 30 in the surface plate 14.

The ears 40, 42, 44 and 46 partition the saddle head 16 into three sections. The ears 40 and 42 define a section for installing a first J-claw 60, while the ears 44 and 46 define a section for installing a second J-claw 62. The ears 42 and 44 define a third section including the bore 56 and a pair of mounting blocks 64 and 66. Each of the ears includes an aperture 68 dimensioned to receive a rocker pin 84 as will be described below.

Referring in particular to FIG. 3, the lower lubricating surface 38 includes a conduit 52 which defines a reservoir for grease or another suitable lubricant, and an inlet 54 which couples at least one grease fitting 55 on the upper surface 36 to the lower lubricating surface 38. The saddle head boss 32 extends from the lower lubricating surface 38 and has a mating relationship with the recess of the saddle surface 14, shown in FIG. 2. At least one grease inlet 54, or a number of inlets corresponding to the number of fittings, can open onto the lower lubricating surface 38 in a position near the boss 32, and the conduit 52 is arranged about the boss 32 and subsequently the bore 33 to provide a lubrication reservoir for lubricating the king pin 18. Preferably, the grease inlet 54 is positioned adjacent the boss 32, and the conduit 52 is arranged in part and circumferentially about the boss 32. More generally, the inlet 54 and conduit 52 can be a continuous duct extending from the grease fitting 55 to the various portions of and including the periphery of the lower lubricating surface 38. While a diamond-shaped conduit/duct is shown if FIG. 3, other configurations can be used with good effect to effectively lubricate the surface 38. For instance and without limitation, conduit/duct 52 can radiate from a centrally located inlet or extend therefrom in a pattern coinciding with or otherwise reaching the peripheral configuration of surface 38. Although the boss 32 is shown as a means for mating the saddle head 16 and surface plate 14, it will be apparent to those of ordinary skill in the art that other coupling means could also be employed. Furthermore, although the conduit 52 is shown on the lower lubricating plate 38, a duct or conduit 52 could also be provided on the surface plate 14. Alternatively, the duct or conduit 52 could also be constructed such that an upper portion of the conduit 52 is configured on the lower lubricating plate 38, and a lower portion is configured on the surface plate 14. In this alternative embodiment, the conduit 52 is formed by the facial arrangement of the lower lubricating plate 38 and the surface plate 14.

Referring again to FIG. 2, to assemble the combination saddle 10, a king pin bolt 18 is threaded through the bores 27, 33, and 56 centered in the base 12, the surface plate 14, and the saddle head 16, respectively. The king pin bolt 18 includes a threaded upper end 72, and a threaded lower end (not shown). When installed, the threaded upper end 72 extends through the bore 56 into the saddle head 16, and the threaded lower end 74 extends through the fifth wheel surface plate 76 on the bottom of the saddle body 12. To hold the king pin 18 in place, a castle nut 78 and washer 80 are threaded into the upper end 72 of the king pin 18, and a fifth wheel pin 82 is threaded onto the lower end of the king pin 18.

To provide a means for coupling the saddle to a towed truck, a first J-claw 60 is assembled on one side of the saddle head 16, and a second J-claw 62 is assembled on the opposite side of the saddle head 16. Each J-claw 60 and 62 includes an aperture 86 for receiving a rocker pin 84. Initially, the J-claw 60 is inserted between the ears 40 and 42 such that apertures extending through the ears and the J-claw are aligned. The rocker pin 84 is then inserted through the apertures, until the innermost end, which is preferably flat as in the shape of a half moon, rests on the rocker pin mounting block 64. The J-claw 62 is inserted in a like manner from the opposite side.

As noted above, a combination saddle can be mounted to a truck either by means of inserting the fifth wheel pin 82 into a fifth wheel socket on the truck or by coupling U bolts through the apertures on the flangular section of the saddle base 12 with the truck frame. Preferably the J-claws are coupled to the front axle of a towed truck, thereby lifting the front wheels of the towed truck off of the ground, and causing the towed truck to roll on the back wheels only. In alternate embodiments, the saddle 10 can be configured to receive a beam and related support apparatus, as shown in FIGS. 1, 3, 9, 12 and 14 of previously referenced and incorporated U.S. Pat. No. 5,772,677. In such embodiments, one saddle 10 is coupled to the frame of the leading truck and a second saddle mount 10 is coupled to the frame of the towed truck. The towed truck is reversed, such that the frames of the two trucks are adjacent. The rear wheels of the towed truck are lifted above the ground, and the truck rolls on the front wheels only.

In fifth wheel applications, a security bolt 90 is inserted through the security bolt hole 28 in the surface plate 14 and the security bolt hole 50 in the saddle head base 34, to prevent the saddle head 16 from rotating on the surface plate 14. In this application, horizontal rotation is provided by the rotation of the fifth wheel pin 82 in the fifth wheel socket on the truck. In applications in which the saddle is mounted directly to the truck frame, however, the saddle head 16 rotates on the surface plate 14 to provide horizontal movement. In this case, the security bolt 90 is removed from the security bolt holes 28 and 50. In both applications, the J-claws 60 and 62 pivot about the rocker pin 84 to provide motion in the up-down plane.

Lubricants are applied to the saddle 10 by applying grease or other known lubricating oils to the grease fitting 55 on the upper surface 36 of the saddle head 16. Lubricants applied to the grease fitting 55 flow through the inlet 54 to the conduit/duct 52 on the lower lubricating surface 38 of the saddle head 16. Although the conduit/duct 52 is shown on the lower surface of the saddle head 16, it will be apparent to one of ordinary skill in the art that the grease reservoir provided by such a component could be located on the surface plate, or could be formed through conjunctive use of appropriately configured lower lubricating plate 38 of the saddle head 16 with an appropriately configured surface plate 14. Such a formation can result from the facial relationship of such components.

Lubricants are retained in the reservoir provided by conduit/duct 52 to continually lubricate the king pin 18. When the saddle 10 is mounted to a truck frame, lubricants are continually applied to the king pin 18 through the rotational motion of the saddle head 16 on the surface plate 14. In fifth wheel applications, lubricants are continually applied to the king pin 18 and extended to the fifth wheel pin 82 by the motion of the fifth wheel pin 82 in the fifth wheel socket. Because the grease fitting 56 is positioned on the upper surface 36 of the saddle head 16, it can be easily accessed by maintenance personnel when lubrication is required. Furthermore, since grease or other lubricants are retained in such a reservoir, the king pin 18 is continually lubricated while the saddle 10 is in use. Therefore, fewer maintenance steps for lubricating the rotating parts are required.

While the principles of this inventions have been described in connection with specific embodiments, it should be understood clearly that these descriptions, along with the chosen figures, are made only by those example and are not intended to limit the scope of this invention, in any manner. Other advantages and features of the invention will become apparent from the following claims, with the scope thereof determined by the reasonable equivalents, as understood by those skilled in the art.

What is claimed is:

1. In combination with a saddle for connecting one wheeled vehicle to another, said saddle having a surface plate, a saddle head defining a king pin aperture and having at least one grease fitting on an upper surface of said saddle head and a grease conduit configured into a lower surface of said head, said head adjacent said plate, said king pin aperature located between said upper and lower saddle head surfaces and said conduit connected to said fitting with a grease inlet.

2. The combination of claim 1 wherein said conduit is arranged about said aperture.

3. The combination of claim 2 wherein said conduit is directed to the periphery of said lower surface.

4. The combination of claim 1 further including a boss extending from said lower surface and configured to have a mating relationship with said surface plate.

5. The combination of claim 4 wherein said conduit is arranged about said boss.

6. The combination of claim 5 wherein said inlet is positioned adjacent to said boss.

7. A saddle assembly for connecting one wheeled vehicle to another, said assembly comprising:
- a saddle body with a threaded king pin positioned in a bore through said body;
- a saddle head coupled to said saddle body with said king pin and defining an aperture for said king pin, said saddle head having at least one grease fitting on an upper portion;
- a horizontal surface plate on said saddle body facing said lower portion of said coupled saddle head; and
- a grease conduit configured into and opening on said saddle head lower portion.

8. The assembly of claim 7 wherein said conduit is arranged around said aperture.

9. The assembly of claim 8 wherein said aperture is further defined by a boss and said conduit is arranged circumferentially about said boss.

10. The assembly of claim 9 wherein said boss is contiguous with a peripheral wall of said conduit.

11. The assembly of claim 9 wherein said conduit is directed toward the periphery of said saddle head lower portion.

12. The assembly of claim 7 wherein said conduit is configured by said facial arrangement of said surface plate and said saddle head lower portion.

13. The assembly of claim 7 further including a fifth wheel pin in threaded engagement with said king pin.

14. The assembly of claim 13 wherein said king pin is positioned within said bore and a conduit for grease to said fifth wheel pin.

15. A method of using rotational saddle movement to lubricate a king pin component of a saddle assembly, said method comprising:
- providing a saddle body with a threaded king pin positioned in a bore through said body, a saddle head coupled to said saddle body with said king pin and defining an aperture for said king pin, said saddle head having at least one grease fitting on an upper portion, a horizontal surface plate on said saddle body facing said lower portion of said coupled saddle head, and a duct configured into and opening on said saddle head lower portion;
- introducing grease through said grease fitting of said head and into said duct;
- retaining grease in said duct; and
- rotating said coupled saddle head about said king pin to apply grease and lubricate said king pin.

16. The method of claim 15 wherein said aperture is further defined by a boss and said duct is arranged circumferentially about said boss.

17. The method of claim 15 wherein said walls of said duct is configured by said facial arrangement of said surface plate and said saddle head lower portion.

18. The method of claim 15 wherein a fifth wheel pin is in threaded engagement with said king pin.

19. The method of claim 18 wherein said king pin is positioned within said bore and a conduit for grease to said fifth wheel pin.

20. The method of claim 19 wherein rotating said saddle head about said king pin further lubricates said fifth wheel pin.

* * * * *

Disclaimer

6,109,642-Schuettenberg, Vancouver, WA (US). SELF-LUBRICATED KING PIN AND SADDLE AS-SEMBLY. Patent dated Aug. 29, 2000. Disclaimer filed Nov. 5, 2007, by the assignee, ATC Leasing Company Inc.

Hereby enters this disclaimer to all complete claims of said patent.
*(Official Gazette February 19, 2008)*